US012572280B2

(12) United States Patent
Adhinarayanan et al.

(10) Patent No.: US 12,572,280 B2
(45) Date of Patent: Mar. 10, 2026

(54) MEMORY CONTROLLER AND NEAR-MEMORY SUPPORT FOR SPARSE ACCESSES

(71) Applicant: Advanced Micro Devices, Inc., Santa Clara, CA (US)

(72) Inventors: Vignesh Adhinarayanan, Austin, TX (US); Niti Madan, Bee Cave, TX (US); Marjan Fariborz, Davis, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/226,932

(22) Filed: Jul. 27, 2023

(65) Prior Publication Data

US 2024/0078017 A1 Mar. 7, 2024

Related U.S. Application Data

(60) Provisional application No. 63/403,117, filed on Sep. 1, 2022.

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0673; G06F 3/0659; G06F 3/0613
See application file for complete search history.

(56) References Cited

U.S. PATENT DOCUMENTS

| | | | |
|---|---|---|---|
| 5,809,530 A | 9/1998 | Samra et al. | |
| 6,202,130 B1 | 3/2001 | Scales, III et al. | |
| 7,870,350 B1 * | 1/2011 | Yu .......... | G06F 13/161 |
| | | | 711/155 |
| 2009/0292861 A1 | 11/2009 | Kanevsky et al. | |
| 2010/0281231 A1 * | 11/2010 | Krishnan .............. | G06F 13/161 |
| | | | 711/E12.001 |
| 2011/0078393 A1 * | 3/2011 | Lin ........................ | G06F 3/0679 |
| | | | 711/155 |

(Continued)

OTHER PUBLICATIONS

Slutskin, Keith—"Into the Fray with SIMD"—Jul. 1997 https://www.cs.umd.edu/users/meesh/cmsc411/website/projects/SIMDproj/project.html (Year: 1997).*

(Continued)

*Primary Examiner* — Edward J Dudek, Jr.
(74) *Attorney, Agent, or Firm* — Polansky & Associates, P.L.L.C.; Paul J. Polansky

(57) ABSTRACT

A data processing system includes a data processor and a memory controller receiving memory access requests from the data processor and generating at least one memory access cycle to a memory system in response to the receiving. The memory controller includes a command queue and a sparse element processor. The command queue is for receiving and storing the memory access requests including a first memory access request including a small element request. The sparse element processor is for causing the memory controller to issue a second memory access request to the memory system in response to the first memory access request with a density greater than a density indicated by the first memory access request.

20 Claims, 7 Drawing Sheets

(56)        References Cited

U.S. PATENT DOCUMENTS

| | | | |
|---|---|---|---|
| 2013/0024630 A1* | 1/2013 | Campbell | G06F 9/522 |
| | | | 711/146 |
| 2015/0006841 A1 | 1/2015 | Chen et al. | |
| 2018/0018291 A1 | 1/2018 | Magro et al. | |
| 2019/0253520 A1 | 8/2019 | Maharana et al. | |
| 2020/0371696 A1 | 11/2020 | Li et al. | |
| 2023/0161506 A1* | 5/2023 | Thatcher | G06F 3/0656 |
| | | | 711/154 |
| 2023/0195368 A1* | 6/2023 | Agarwal | G06F 12/0238 |
| | | | 711/154 |

OTHER PUBLICATIONS

Jedec Standard; "High Bandwidth Memory DRAM (HBM3)";
JESD209-4B (Revision of JESD238, Jan. 2022); Jedec Solid State
Technology Association; 3103 North 10th Street, Suite 240 South,
Arlington, VA 22201-2107; 268 pages.
International Search Report and Written Opinion for International
Application No. PCT/US2023/031288, mailed Nov. 30, 2023, 8
pages.

* cited by examiner

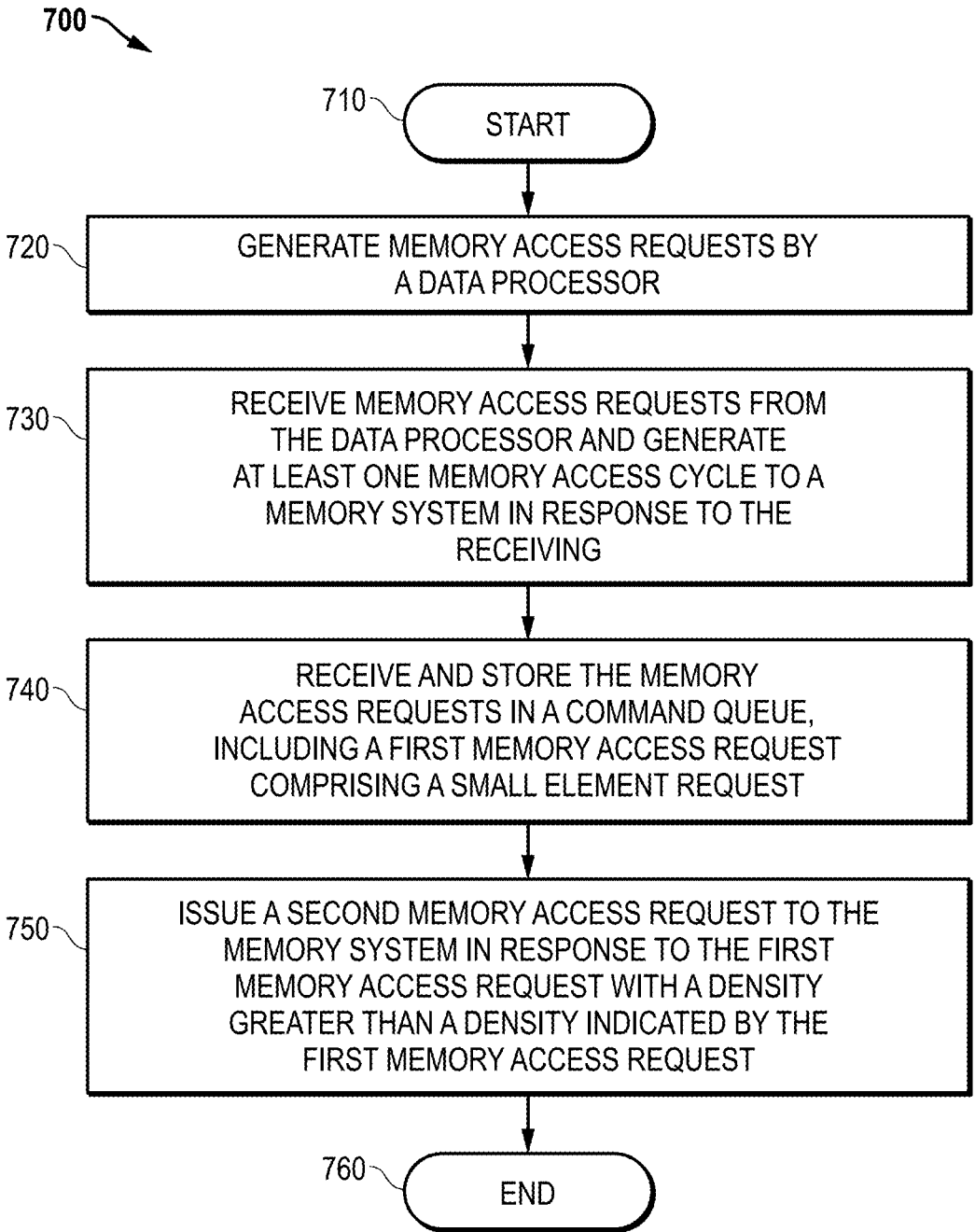

700

710 — START

720 — GENERATE MEMORY ACCESS REQUESTS BY A DATA PROCESSOR

730 — RECEIVE MEMORY ACCESS REQUESTS FROM THE DATA PROCESSOR AND GENERATE AT LEAST ONE MEMORY ACCESS CYCLE TO A MEMORY SYSTEM IN RESPONSE TO THE RECEIVING

740 — RECEIVE AND STORE THE MEMORY ACCESS REQUESTS IN A COMMAND QUEUE, INCLUDING A FIRST MEMORY ACCESS REQUEST COMPRISING A SMALL ELEMENT REQUEST

750 — ISSUE A SECOND MEMORY ACCESS REQUEST TO THE MEMORY SYSTEM IN RESPONSE TO THE FIRST MEMORY ACCESS REQUEST WITH A DENSITY GREATER THAN A DENSITY INDICATED BY THE FIRST MEMORY ACCESS REQUEST

760 — END

FIG. 7

MEMORY CONTROLLER AND NEAR-MEMORY SUPPORT FOR SPARSE ACCESSES

BACKGROUND

Many fine-grained dynamic random access memory (DRAM) organizations support the ability to fetch sparse data of very small sizes, e.g., sizes in the range of four bytes (4B) to sixteen bytes (16B), from different DRAM rows. While the DRAM organization supports the ability to read and write sparse data at a very high bandwidth, the memory controller's command queue size typically is fixed and proves to be a bottleneck. Moreover, the command queue uses associational memory organized as a content address-able memory (CAM) which is accessed by an arbiter that scans the command queue for commands that are ready to be issued to memory and can be efficiently scheduled. More-over, in many applications such as image processing and stencil computation, there is a need to request sparse data, making efficient scheduling of the sparse memory access requests especially difficult.

BRIEF DESCRIPTION OF THE DRAWINGS

FIG. 7 illustrates a flow chart of a process for supporting sparse accesses in a data processing system according to some implementations.

Figure 1:
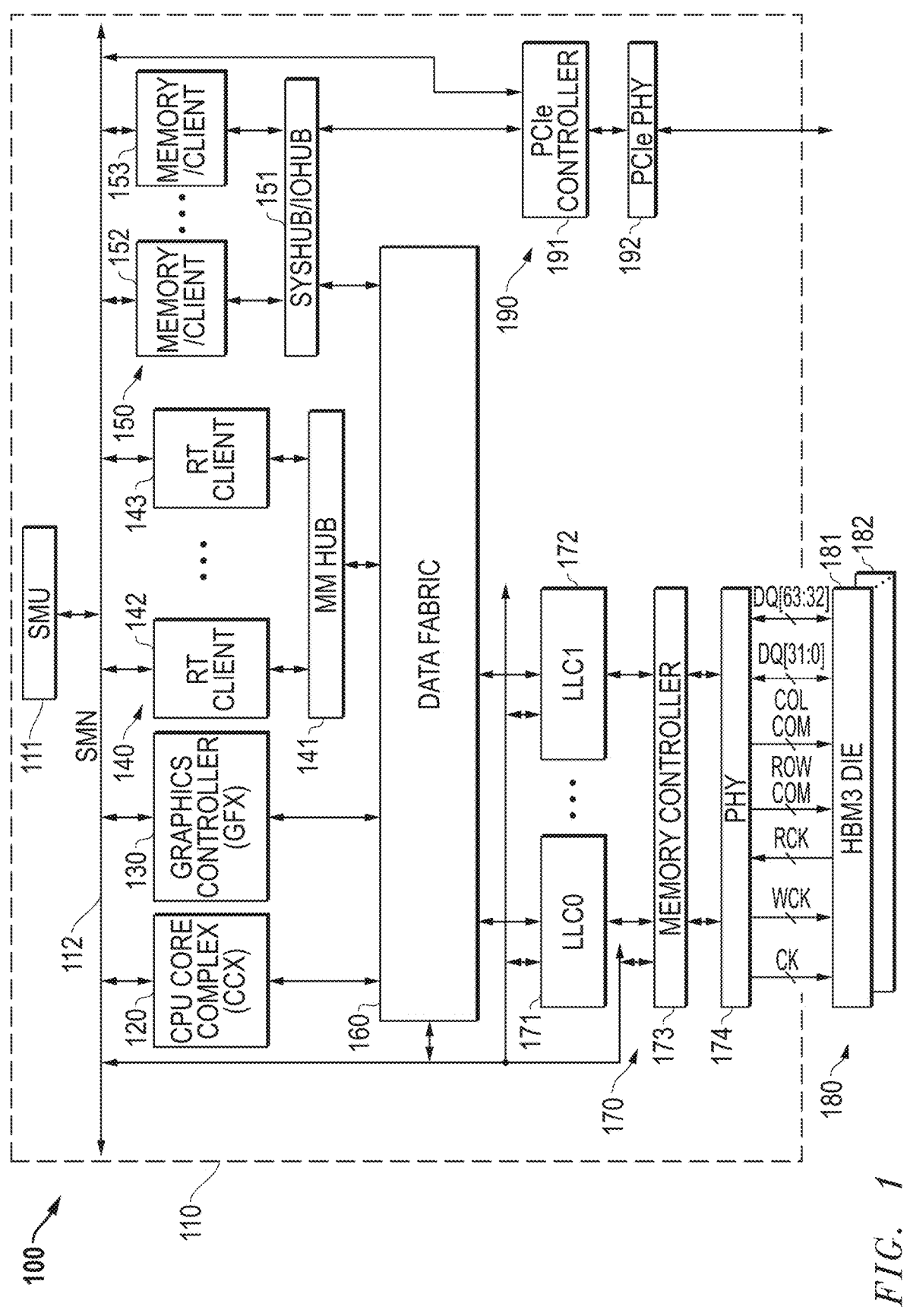
FIG. 1 illustrates in block diagram for a data processing system according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

A data processing system includes a data processor and a memory controller receiving memory access requests from the data processor and generating at least one memory access cycle to a memory system in response to the receiving. The memory controller includes a command queue and a sparse element processor. The command queue is for receiving and storing the memory access requests including a first memory access request including a small element request. The sparse element processor is for causing the memory controller to issue a second memory access request to the memory system in response to the first memory access request with a density greater than a density indicated by the first memory access request.

A data processing system includes a data processor, a data fabric, and a memory controller. The data processor includes at least one compute unit adapted to generate sparse requests. The memory controller is coupled to the data processor through the data fabric. The data processing system includes a coalescing unit operative to combine a plurality of the sparse requests from the data processor and to form a dense request in response. The memory controller is operative to receive and schedule the dense request.

A method for use in a data processing system includes generating memory access requests by a data processor. The memory access requests are received from the data proces-sor, and at least one memory access cycle is generated to a memory system in response to the receiving. The memory access requests are received and stored in a command queue, and include a first memory access request including a small element request. A second memory access request is issued to the memory system in response to the first memory access request with a density greater than a density indicated by the first memory access request.

FIG. 1 illustrates in block diagram for a data processing system 100 according to some implementations. Data pro-cessing system 100 includes a data processor in the form of an SOC 110, an external basic input/output system memory 157 labelled "BIOS", and a memory 180 in the form of an external High Bandwidth Memory, version 3 synchronous dynamic random-access memory (HBM3 SDRAM) system. HBM3 SDRAM is just an example of the type of memory that can be used, and the techniques disclosed herein are applicable to data processing systems with other types of memory, such as Double Data Rate, version 5 (DDR5) SDRAM and graphics double data rate, version six (GDDR6) SDRAM. Many other components of an actual data processing system are typically present but are not relevant to understanding the present disclosure and are not shown in FIG. 1 for ease of illustration.

SOC 110 includes generally a system management unit 111 labelled "SMU", a system management network 112 labelled "SMN", a central processing unit (CPU) core com-plex 120 labelled "CCX", a data processor 130 in the form of a graphics controller labelled "GFX", a real-time client subsystem 140, a memory/client subsystem 150, a data fabric 160, a memory channel 170 to memory system 180, and a Peripheral Component Interface Express (PCIe) sub-system 190. As will be appreciated by a person of ordinary skill, SOC 110 may not have all of these elements present in every implementation and, further, may have additional elements included therein.

System management unit 111 is bidirectionally connected to the major components in SOC 110 over system manage-ment network 112. System management network 112 forms a control fabric for SOC 110. System management unit 111 is a local controller that controls the operation of the resources on SOC 110 and synchronizes communication among them. System management unit 111 manages power-up sequencing of the various processors on SOC 110 and controls multiple off-chip devices via reset, enable, and other signals. System management unit 111 includes one or more clock sources (not shown), such as a phase locked loop (PLL), to provide clock signals for each of the components of SOC 110. System management unit 111 also manages power for the various processors and other functional blocks, and may receive measured power consumption values from CPU cores in CPU core complex 120 and data processor 130 to determine appropriate P-states.

CPU core complex 120 includes a set of CPU cores, each of which is bidirectionally connected to system management unit 111 over system management network 112. Each CPU core may be a unitary core only sharing a last-level cache with the other CPU cores, or may be combined with some but not all of the other cores in clusters.

Data processor 130 is bidirectionally connected to system management unit 111 over system management network 112. Data processor 130 is a high-performance graphics processing unit capable of performing graphics operations such as vertex processing, fragment processing, shading, texture blending, and the like in a highly integrated and parallel fashion. In order to perform its operations, data processor 130 requires periodic access to external memory. In the implementation shown in FIG. 1, data processor 130 shares a common memory subsystem with CPU cores in CPU core complex 120, an architecture known as a unified memory architecture. Because SOC 110 includes both a CPU and a GPU, it is also referred to as an accelerated processing unit (APU).

Real-time client subsystem 140 includes a set of real-time clients such as representative real time clients 142 and 143, and a memory management hub 141 labelled "MM HUB". Each real-time client is bidirectionally connected to system management unit 111 over system management network 112, and to memory management hub 141. Real-time client subsystem 140 could include any type of peripheral controller that requires periodic movement of data, such as an image signal processor (ISP), an audio coder-decoder (codec), a display controller that renders and rasterizes objects generated by data processor 130 for display on a monitor, and the like.

Memory/client subsystem 150 includes a set of memory elements or peripheral controllers such as memory/client devices 152 and 153, and a system and input/output hub 151 labeled "SYSHUB/IOHUB". Each memory/client device is bidirectionally connected to system management unit 111 over system management network 112, and to system and input/output hub 151. Memory/client devices 152 and 153 are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like. In SOC 110, memory/client device 153 is adapted to connect to an external memory storing a basic input/output system (BIOS), that is, external basic input/output system memory 157.

Data fabric 160 is an interconnect that controls the flow of traffic in SOC 110. Data fabric 160 is bidirectionally connected to system management unit 111 over system management network 112, and is bidirectionally connected to CPU core complex 120, data processor 130, memory management hub 141, system and input/output hub 151. Data fabric 160 includes a crossbar switch for routing memory-mapped access requests and responses between any of the various devices of SOC 110. It includes a system memory map, defined by a basic input/output system (BIOS), for determining destinations of memory accesses based on the system configuration, as well as buffers for each virtual connection.

Memory channel 170 is a circuit that controls the transfer of data to and from memory system 180. Memory channel 170 includes a last-level cache 171 for a first channel labelled "LLC0", a last-level cache 172 for a second channel labelled "LLC1", a memory controller 173, and a physical interface circuit 174 labelled "PHY" connected to memory system 180. Last-level cache 171 is bidirectionally connected to system management unit 111 over system management network 112 and has an upstream port bidirectionally connected to a downstream port of data fabric 160, and a downstream port. Last-level cache 172 is bidirectionally connected to system management unit 111 over system management network 112 and has an upstream port bidirectionally connected to a downstream port of data fabric 160, and a downstream port. Memory controller 174 has a first upstream port bidirectionally connected to the downstream port of last-level cache 171, a second upstream port bidirectionally connected to the downstream port of last-level cache 172, and first and second downstream ports. Physical interface circuit 174 has a first upstream port bidirectionally connected to the first downstream port of memory controller 173, a second upstream port bidirectionally connected to the second downstream port of memory controller 173, and a downstream port bidirectionally connected to memory system 180.

In the illustrated implementation, memory system 180 includes a set of HBM3 dice, including an HBM3 die 181 and an HBM3 die 182. Each HBM3 die operates according to the HBM3 standard. In other implementations, HBM3 die can be replaced with, for example DDR5 DIMMs.

The bidirectional connection between physical interface circuit 174 and memory system 180 includes signal groups as defined by the HBM3 standard, including separate signals for each channel as well as shared control signals.

In operation, SOC 110 integrates a complex assortment of computing and storage devices, including CPU core complex 120 and data processor 130, on a single chip. Most of these controllers are well known and will not be discussed further. SOC 110 includes multiple internal buses for conducting data between these circuits at high speed. For example, CPU core complex 120 accesses data over a high-speed, 32-bit bus through an upstream port of data fabric 160. Data fabric 160 multiplexes accesses between any of a number of memory accessing agents connected to its upstream ports, and memory accessing responders connected to its downstream ports. Because of the large number of memory accessing agents and memory accessing responders, the number of internal bus lines is quite large as well and a crossbar switch in data fabric 160 multiplexes these wide buses to form virtual connections between the memory access requesters and the memory accessing responders.

The various processing nodes also maintain their own cache hierarchies. In a typical configuration, CPU core complex 120 includes four data processor cores each having its own dedicated level-one (L1) and level two (L2) caches, and having a level three (L3) cache shared between the four CPU cores in the cluster. In this example, last-level caches 171 and 172 would form level four (L4) caches, but regardless of the internal organization of the cache hierarchies in CPU core complex 120, they operate as the last-level caches in the cache hierarchy. In one example, last-level caches 171 and 172 implement inclusive caches, in which any cache line stored in any higher-level cache in SOC 110 will also be stored in them. In another example, last-level caches 171 and 172 are victim caches, and include cache lines each of which contained data that was requested by a data processor at an earlier point in time, but that ultimately became the least recently used cache line and was evicted from all upper-level caches.

The inventors have observed that in many applications such as image processing and stencil computation, there is a need to request sparse data, and the memory controller could operate at a much coarser level of granularity (e.g., scheduling decisions could be made for a collection of sparse requests in bulk). A data processing system can reduce the overhead on the DRAM controller queue by grouping sparse requests when appropriate. Deeply associative command queues in the memory controller can hold only a few entries due to the area overhead of content addressable memory (CAM) structures for scheduling logic. Memory controllers according to the present disclosure support requesting many small elements by making coarse scheduling decisions (aided by software) and executing a coarse request comprised of many fine-grain requests atomically.

According to various implementations to be described here and in further detail below, SOC 110 detects sparse requests and converts them into denser requests for better use of the memory system. According to one aspect, data processor 130 includes a set of individual graphics compute units, in which each graphics compute unit includes multiple single instruction, multiple data (SIMD) compute units in a massively parallel architecture. The graphics controller includes a coalescing unit that combines sparse accesses across GPU compute units into denser requests before sending them through data fabric 160 and memory controller 173 to a memory.

According to another aspect, memory controller 173 includes a sparse element processor that is connected to a command queue. The sparse element processor scans the command queue and identifies memory access requests that can be combined into a denser request before sending them through physical interface circuit 174 to memory system 180. In one particular implementation, the sparse element processor identifies an entry in the command queue having a pattern attribute that indicates a set of individual memory accesses having a pattern associated therewith. For example, the pattern can be a set of accesses forming a stride access having an associated stride length and memory access size. In this case, the sparse element processor can generate individual memory accesses to the memory system in response to the pattern attribute of a single entry in the command queue. Examples of other patterns that could be supported include 9-point stencil, a 27-point stencil, and any predefined filter in image processing.

According to yet another aspect, the sparse element processor recognizes memory access requests in the command queue that include a write memory access request to a first address having a first size and the first memory access request includes a read memory access request subsequent to the write memory access request having a second size smaller than the first size and a second address within a region indicated by the first address and the first size. In this case, the sparse element processor completes the read memory access request with data from the write memory access request without accessing the memory system.

According to still another aspect, the sparse element processor detects memory access requests including a first read request to a first address and a second read request to a second address related to the first address, wherein the second read request is for a small element having a size less than a large atom, wherein the large atom is a largest unit of a memory system coupled to the memory controller addressable in a single bus transaction. In this case, the sparse element processor upgrades a size of the second read request to a larger size in anticipation that it will be able to satisfy further small element requests to the data in the same larger atom that are currently in or eventually will be added to command queue 430.

By using these techniques, either alone or in various combinations with each other, the data processor or memory controller improves the utilization efficiency of the limited number of entries in the command queue and keeps the command queue size relatively small.

Figure 2:
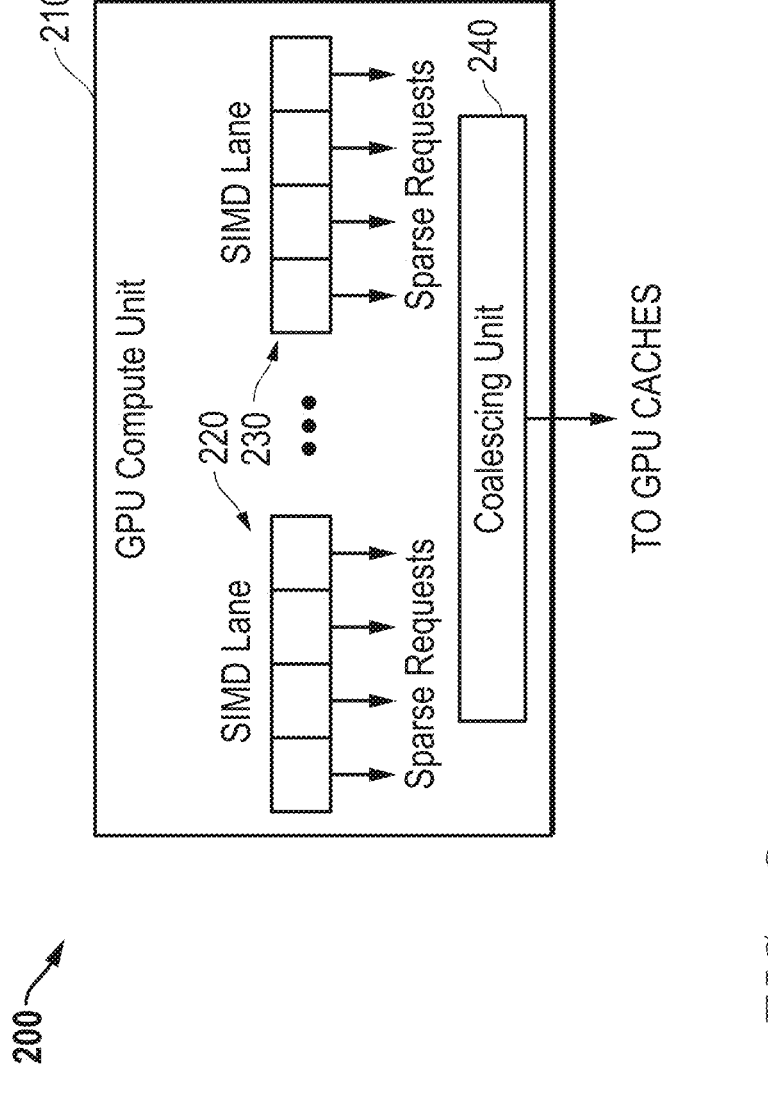
FIG. 2 illustrates in block diagram form a portion of a graphics processing unit (GPU) known in the prior art.

FIG. 2 illustrates in block diagram form a portion of a graphics processing unit 200 known in the prior art. Graphics processing unit 200 includes a set of GPU compute units, such as GPU compute unit 210 shown in FIG. 2. GPU compute unit 210 includes generally sets of single instruction, multiple data (SIMD) lanes, for example a first representative set of GPU lanes 220 and a last representative set of GPU lanes 230. Each lane performs computations on a common data set but generates sparse memory access requests. GPU compute unit 210 also includes a coalescing unit 240 that combines the sparse requests to form denser requests and provides the denser requests to a GPU cache hierarchy. Graphics processing unit 200 leverages the common processing task performed by the different compute units on the same data set, e.g., three-dimensional overlapping objects for a common frame in a massively parallel architecture, to convert sparse requests to somewhat denser requests. Due to the recursive nature of the SIMD computations, however, GPU compute unit 210 has a limited capability to for improving the efficiency of the memory system, and the limited density of the requests, so combined, still significantly limits the efficiency of accesses for a given size of the memory controller's command queue.

Figure 3:
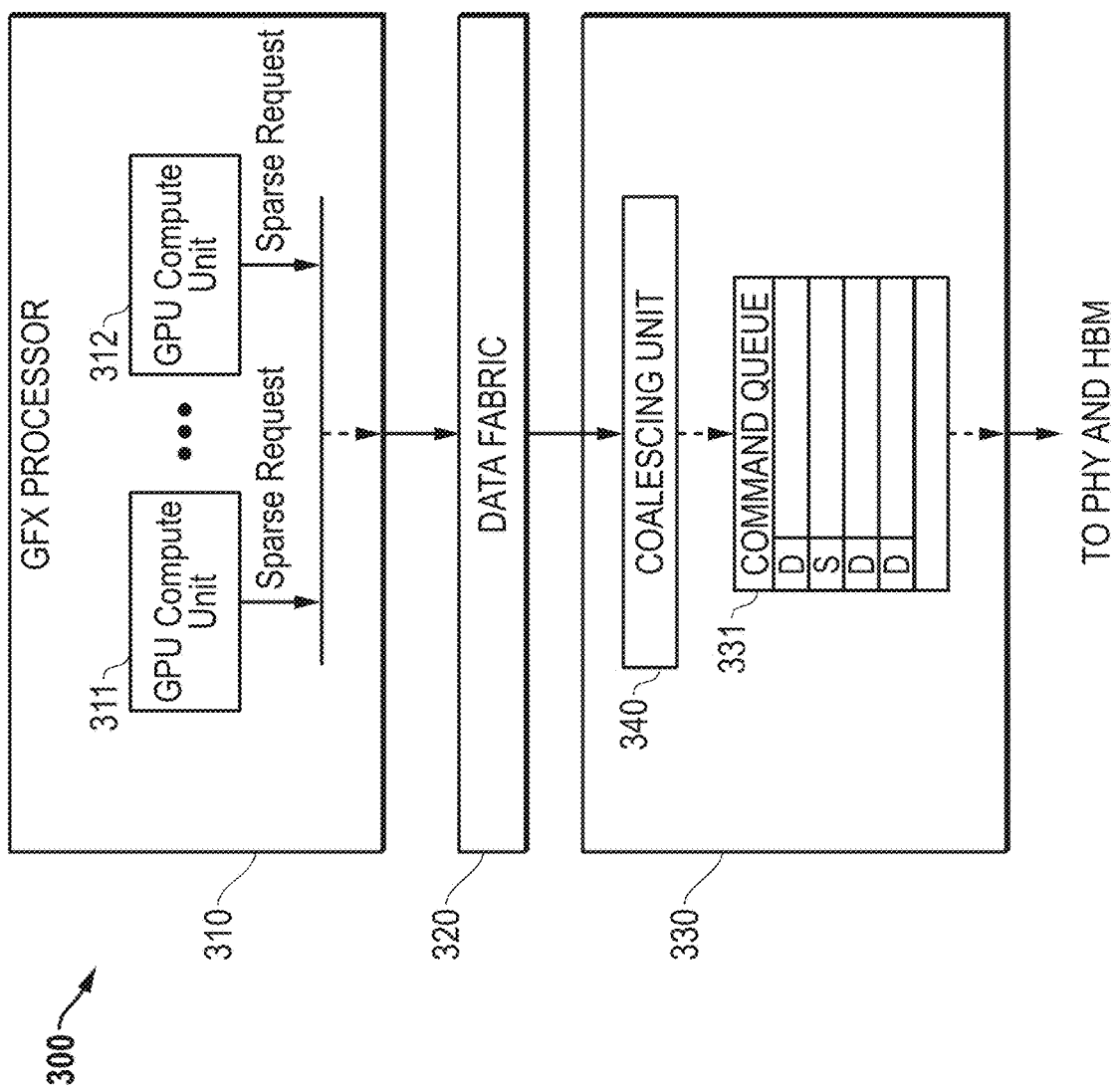
FIG. 3 illustrates in block diagram form a data processing system with memory access coalescing according to some implementations.

FIG. 3 illustrates in block diagram form a data processing system 300 with memory access coalescing according to some implementations. Data processing system 300 includes generally a data processor 310, a data fabric 320, and a memory controller 330. Data processor 310 is a graphics processor and is labelled "GFX PROCESSOR" in FIG. 2. It includes a set of GPU compute units, including a representative GPU compute unit 311 and a representative GPU compute unit 312, and a coalescing unit 313. Each of GPU compute units 311 and 312 have an output for providing requests including many sparse requests to corresponding inputs of coalescing unit 313. Coalescing unit 313 has an output for providing memory access requests including coalesced accesses.

Data fabric 320 has an upstream port connected to the output of coalescing unit 313, and a downstream port. As used herein, an upstream port is a port on a side away from memory and, a downstream port is a port on a side toward memory. The upstream port of data fabric 320 receives memory access requests from data processor 310, and provides memory access responses to data processor 310. FIG. 3 shows arrows indicating the directions of flows of memory access requests, including read requests and write requests, which flow away from the processor and toward the memory.

Memory controller 330 has an upstream port connected to the downstream port of data fabric 320, and a downstream port. Memory controller 330 includes a command queue 331. Command queue 331 has a set of entries, each containing a decoded address and a set of metadata that are stored in content-addressable memory and that therefore are searchable based on their contents, in addition to their location in command queue 331. As shown in FIG. 3, command queue 331 stores both sparse requests marked with an "S", and dense requests marked with a "D". The four representative requests in command queue 331 include a first, dense request, a second, sparse request, and third and fourth dense requests.

Each of GPU compute units 311 and 312 performs a specified function, e.g., a graphics primitive expressed using the OpenGL programming language, and operate on overlapping sets of data. For example, GPU compute unit 311 could perform shading while GPU compute unit 312 performs rasterization. Data processing system 300 performs these functions on overlapping data sets, and data processing system 300 leverages the existence of overlapping data accesses from different compute units generated by the different processing tasks, but moves the coalescing unit nearer to memory. Thus, the near-memory coalescing provides more opportunities to combine sparse accesses into dense (or denser) accesses and to decrease the size of the memory controller's command queue (or avoid stalling and inefficiency with command queues of a given size).

Figure 4:
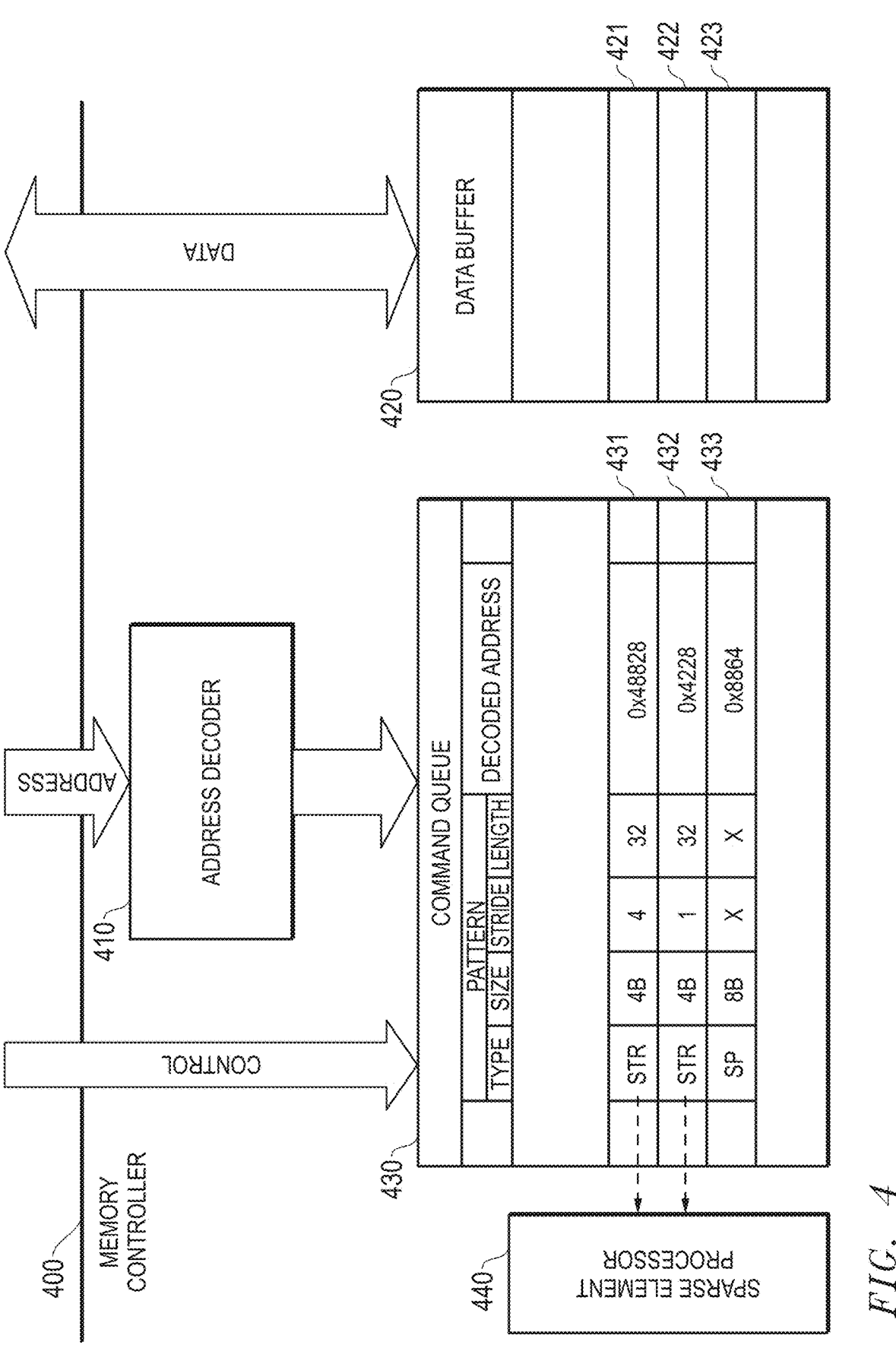
FIG. 4 illustrates in block diagram form a portion of a memory controller for use with a data processor having a sparse element processor according to some implementa-tions.

FIG. 4 illustrates in block diagram form a portion of a memory controller 400 for use with a data processor having a sparse element processor 440 according to some implementations. Memory controller 400 includes generally an address decoder 410, a data buffer 420, a command queue 430, and a sparse element processor 440.

Address decoder 410 has an input for receiving an address, and an output. Address decoder 410 maps physical addresses received in canonical form to memory addresses of the memory that populated in the data processing system. The decoding involves mapping the canonical addresses generated by memory accessing agents to memory base addresses, offsets, bank addresses, and bank group addresses for memory types that are implemented in the data processing system.

Data buffer 420 has a set of entries corresponding to locations in command queue 430, a bidirectional upstream port connected to a downstream port of the data fabric, and a downstream port (not shown in FIG. 4) connected to the physical interface circuit and ultimately to memory.

Command queue 430 includes a set of entries. Each entry corresponds to at least one memory access request, and includes a DECODED ADDRESS field and a large set of metadata that indicates attributes of the memory access requests. As shown in FIG. 4, command queue 430 includes a PATTERN field, which includes a set of sub-fields including a TYPE sub-field, a SIZE subfield, a STRIDE subfield, and a LENGTH sub-field.

Shown in memory controller 400 are entries 431, 432, and 433 that illustrate exemplary encodings of memory access requests. Entry 431 corresponds has a DECODED ADDRESS of 0x48828 and has a TYPE labelled "STR" to indicate a strided access. The SIZE field indicates the strided access accesses four-byte (4B) data elements, at a STRIDE of 4 32-bit words, and a LENGTH of 32 strides. Entry 432 corresponds to DECODED ADDRESS of 0x4228 and has a TYPE labelled "STR" to indicate a strided access, a SIZE of four bytes (4B), a STRIDE of 1 32-bit data word, and a LENGTH of 32 strides. Entry 433 corresponds to DECODED ADDRESS of 0x8864 and has a type labelled "SP" to indicate a sparse (non-strided) access, having a SIZE of eight bytes (8B). Because it is a single, sparse access, the values of the STRIDE and LENGTH sub-fields are don't- cares. It should be apparent that these particular encodings are merely exemplary, and other PATTERNs are possible.

Sparse element processor 440 is connected to command queue 430 and is able to extract matching data elements from the content-addressable memory used for command queue 430. In particular, it searches command queue 430 for patterned accesses, and then unpacks the command to generate a number of individual sparse commands indicated by the LENGTH field. By encoding complex memory access types and including sparse element processor 440 to generate multiple memory commands based on a single entry of command queue 430, memory controller 400 is able to conserve its limited number of entries to generate a greater number of commands, or alternatively, to be smaller in size to accommodate a typical range of accesses in a data processor with diverse numbers and types of data processor cores.

Figure 5:
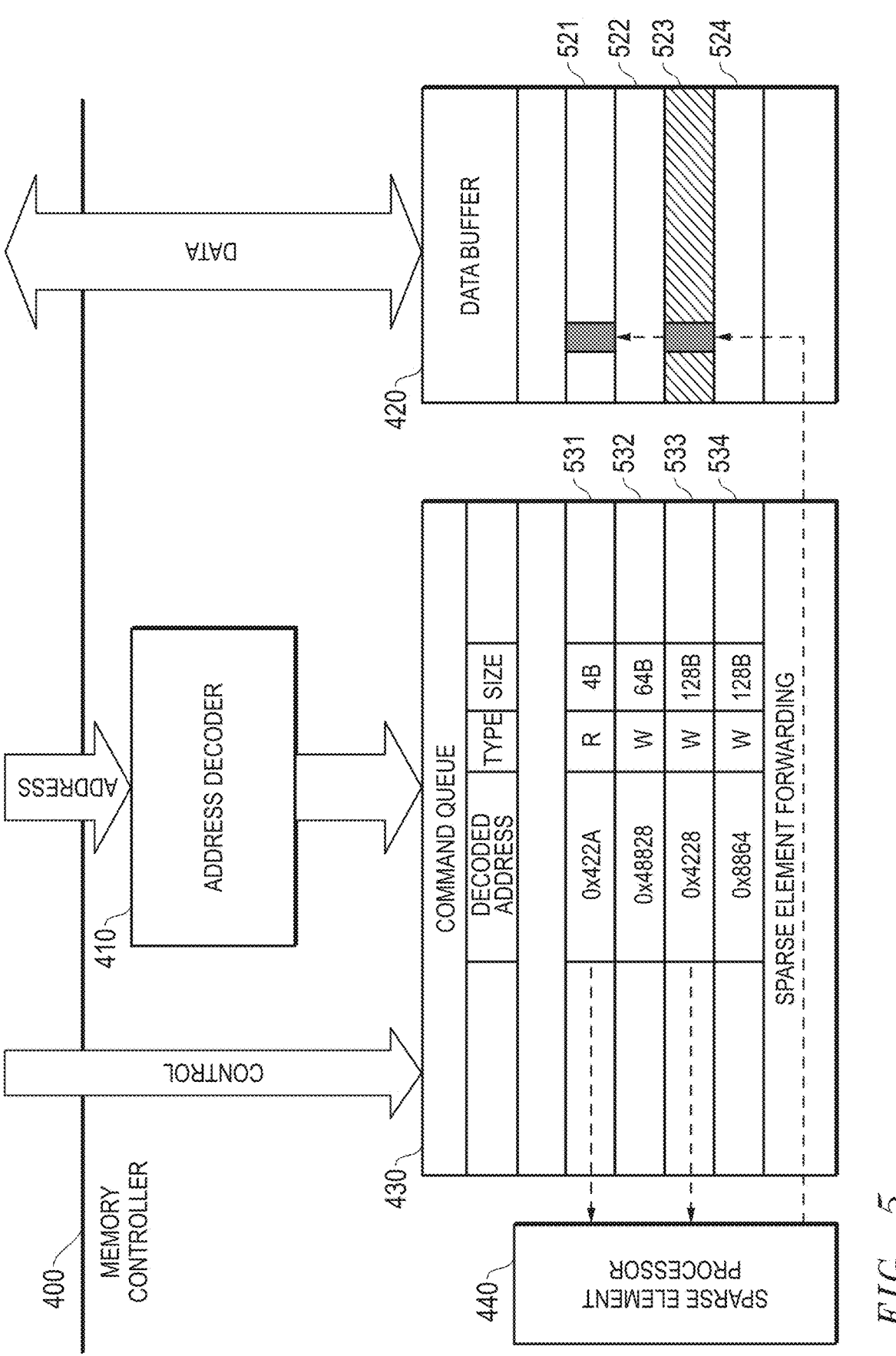
FIG. 5 illustrates in block diagram form a portion of a memory controller for use with a data processor having a sparse element processor according to some other imple-mentations.

FIG. 5 illustrates in block diagram form a portion of memory controller 400 for use with a data processor having a sparse element processor 440 according to some other implementations. Memory controller 400 includes generally address decoder 410, data buffer 420, command queue 430, and sparse element processor 440 interconnected as described above. However as shown in FIG. 5, data buffer 420 includes four data buffer entries 521, 522, 523, and 524 with corresponding command queue entries 531, 532, 533, and 534, respectively, in command queue 430. As shown in FIG. 5, command queue 430 has additional metadata fields including a TYPE field and a SIZE field. The TYPE field indicates whether the access is a read or write access. The SIZE field indicates the size of the access. Thus as shown in FIG. 5, command queue entry 531 is a read access (TYPE=R) of a four-byte data element (SIZE=4B) to address 0x422A; command queue entry 532 is a write access (TYPE=W) of a sixty-four byte data element (SIZE=64B) to address 0x48828; command queue entry 533 is a write access (TYPE=W) of a one hundred twenty eight byte data element (SIZE=128B) to address 0x4228; and command queue entry 533 is a write access (TYPE=W) of a one hundred twenty eight byte data element (SIZE=128B) to address 0x8864.

According to some implementations, sparse element processor 440 scans command queue 430 for opportunities to satisfy memory access requests, especially sparse memory requests, based on forwarding data elements within data buffer 420. As shown in FIG. 5, command queue 430 detects a large atom (128B) write to address 0x4228 with a subsequent (in program order) small atom read to address 0x422A, wherein a small atom is the smallest data size that can be independently fetched from memory. In this example, the updated data element at 0x422A is within the data held in data buffer 420 for the earlier write cycle. Upon detecting that condition, sparse element processor 440 activates a control signal labelled "SPARSE ELEMENT FORWARDING" that causes the 4B data element at address 0x422A that resides in data buffer entry 523 to be forwarded to the corresponding portion of data buffer entry 521. In this way, the subsequent read access can be completed and command queue entry 531 and data buffer entry 521 returned to the pool of unassigned entries quickly. Thus, the sparse element forwarding mechanism allows data buffer 420 and command queue 430 to have fewer entries for a given level of risk of stalling, or have a smaller risk of stalling for a given size of data buffer 420 and command queue 430.

The read and write accesses can be stored physically in command queue 430 in the order received, or they can be assigned a tag that indicates their relative order compared to other entries. The small element forwarding mechanism can be triggered on different small atom sizes, or can be limited to one small atom size, based on assumptions about the workload.

Figure 6:
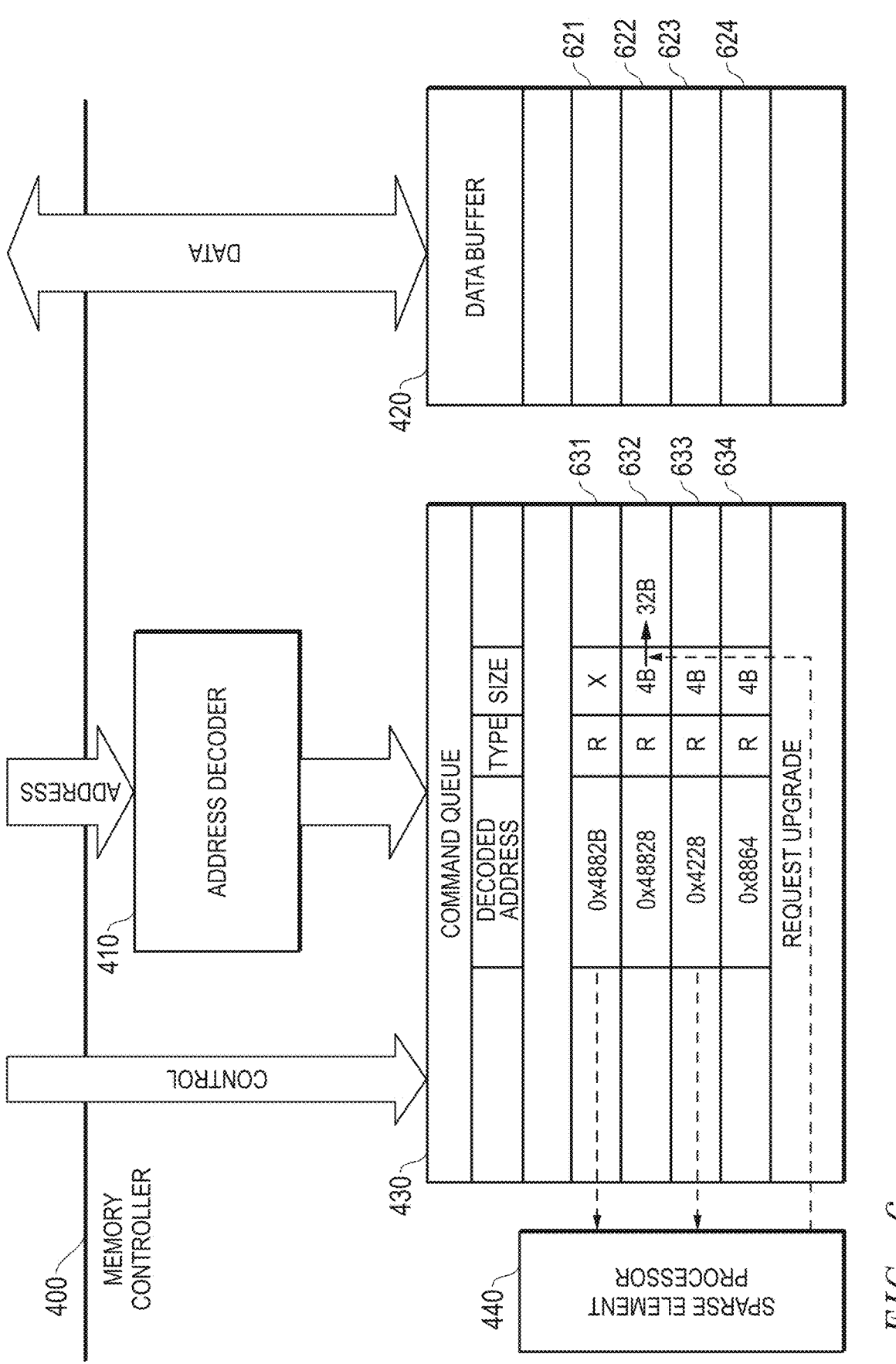
FIG. 6 illustrates in block diagram form a portion of a memory controller for use with a data processor having a sparse element processor according to some other imple-mentations.

FIG. 6 illustrates in block diagram form a portion of memory controller 400 for use with a data processor having a sparse element processor 440 according to some other implementations. Memory controller 400 includes generally address decoder 410, data buffer 420, command queue 430, and sparse element processor 440 interconnected as described above. However as shown in FIG. 6, data buffer 420 includes four data buffer entries 621, 622, 623, and 624 with corresponding command queue entries 631, 632, 633, and 634, respectively, in command queue 430. Command queue 430 has the same additional metadata TYPE field and a SIZE field as described with respect to FIG. 5 above. Thus as shown in FIG. 6, command queue entry 631 is a read access (TYPE=R) with a don't-care size (SIZE=X) to address 0x4882B; command queue entry 632 is a read access (TYPE=R) of a four byte data element (SIZE=4B) to address 0x48828; command queue entry 633 is a read access (TYPE=R) of a four byte data element (SIZE=4B) to address 0x4228; and command queue entry 534 is a read access (TYPE=R) of a four byte data element (SIZE=4B) to address 0x8864.

According to some implementations, sparse element processor 440 scans command queue 430 for opportunities to upgrade memory access requests to larger sizes to be able to satisfy multiple sparse element memory access cycles based on multiple sparse data elements accessing the small atoms within the same larger atom. In this case, the sparse access to address 0x48828 would encompass data within a larger atom request to address 0x48828. In response to detecting this opportunity, sparse element processor 440 upgrades the 4B read access to address 0x48828 to a 32B access, which is large enough to encompass the subsequent small atom request to address 0x4882B. Thus, after the 32B access to 0x48828, sparse element processor 440 can complete both the read request at 0x48828 and 0x4882B, allowing both entries to be completed sooner, and the subsequent read access can be completed and command queue entry 631 and data buffer entry 621 returned to the pool of unassigned entries quicker. Thus, the request upgrade mechanism allows data buffer 420 and command queue 430 to have fewer entries for a given level of risk of stalling, or have a smaller risk of stalling for a given size of data buffer 420 and command queue 430.

The read and write accesses can be stored physically in command queue 430 in the order received, or they can be assigned a tag that indicates their relative order compared to other entries. Also, the request upgrade mechanism can be triggered by one additional sparse element in a larger atom, or can be triggered by multiple additional sparse elements in a larger atom, based on assumptions about the workload.

FIG. 7 illustrates a flow chart of a process 700 for supporting sparse accesses in a data processing system such as data processing system 100 of FIG. 1 according to some implementations. Process 700 starts in an action box 710. An action box 720 includes generating memory access requests by a data processor (e.g., data processor 130). An action box 730 includes receiving memory access requests from the data processor (e.g., data processor 130), and generating at least one memory access cycle to a memory system (e.g., memory system 180) in response to the receiving. An action box 740 includes receiving and storing the memory access requests in a command queue (e.g., command queue 430), including a first memory access request comprising a small element request. An action box 750 includes issuing a second memory access request to the memory system (e.g., memory system 180) in response to the first memory access request with a density greater than a density indicated by the first memory access request. In one example, sparse element processor 440 issues memory access requests with a greater density by combining two or more small element requests into one larger element request. In another example, sparse element processor 440 issues memory access requests with a greater density by encoding the right amount of data, such as by issuing a single small atom request instead of a large atom request when the small atom request is sufficient to transfer all needed data. Thus, issuing memory access requests with greater density improves efficiency such as by increasing the utilization of the limited number of command queue slots in memory controller 330 and/or avoiding fetching unneeded data. Process 700 ends in an action box 760.

A data processor, memory controller, portions thereof described herein can be embodied one or more circuits, any of which may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular implementations have been described, various modifications to these implementations will be apparent to those skilled in the art. For example, the four specific techniques discussed (request coalescing, access pattern encoding, sparse element forwarding, and request upgrade) can be used individually or in different combinations in various implementations of the memory controller and system on chip (SOC). The memory request coalescing can be based on outputs of multiple GPU compute units, or based on outputs of other types of data processors. Various types of memory may be used, including HBM3 SDRAM, DDR5 SDRAM, and GDDR6 SDRAM, as well as other current and future memory technologies. While coalescing unit 340 is near-memory and was shown as being a part of memory controller 330, in other implementations it can be located in or associated with other circuitry downstream from the processors generating the sparse requests. The components of the data processing systems described above can also be combined into separate integrated circuit dice in various combinations.

Accordingly, it is intended by the appended claims to cover all modifications of the disclosed implementations that fall within the scope of the disclosed implementations.

What is claimed is:

1. A data processing system, comprising:
   a data processor:
   a memory controller for receiving memory access requests from the data processor and generating at least one memory access cycle to a memory system in response to the receiving, comprising:

a command queue for receiving and storing the memory access requests including a first memory access request comprising a small element request, wherein the small element request is a read request to a first address for a small element having a first size less than a large atom, and a second memory access request that is a read request to a second address related to the first address; and a sparse element processor for causing the memory controller to issue a read access to the memory system in response to the first and second memory access requests with a density greater than a density indicated by the first memory access request.

2. The data processing system of claim 1, wherein:

the first memory access request has a pattern attribute that indicates a plurality of individual memory accesses associated therewith; and the sparse element processor generates the plurality of individual memory accesses to the memory system in response to the pattern attribute.

3. The data processing system of claim 2, wherein the pattern attribute indicates the plurality of individual memory accesses are related to each other by one or more of: a stride, points in a stencil operation, coefficients of a digital filter operation, and variables of the digital filter operation.

4. The data processing system of claim 3, wherein the pattern attribute indicates the plurality of individual memory accesses are further related to each other by a data size and an access length.

5. The data processing system of claim 1, wherein:

the memory access requests include a write memory access request to a third address having a third size and the command queue receives the first memory access request subsequent to receiving the write memory access request, wherein the first size is smaller than the third size and the first address is within a region indicated by the third address and the third size.

6. The data processing system of claim 5, wherein:

the sparse element processor completes the first memory access request with data from the write memory access request without accessing the memory system.

7. The data processing system, of claim 6, wherein:

the sparse element processor further completes the first memory access request by forwarding data from an entry of a data buffer corresponding to the write memory access request.

8. The data processing system, of claim 1, wherein:

the second memory access request is a small element request having a size less than the large atom.

9. The data processing system, of claim 8, wherein:

the sparse element processor is operable to upgrade a second size of the second memory access request to a large atom.

10. The data processing system of claim 9, wherein:

the second size corresponds to a small atom, wherein the small atom is smaller than the large atom.

11. A data processing system, comprising:

a data processor comprising at least one compute unit adapted to generate sparse requests;

a data fabric; and a memory controller coupled to the data processor through the data fabric, wherein the data processing system comprises a coalescing unit operative to combine a plurality of the sparse requests from the data processor and to form a dense request in response, wherein the dense request corresponds to a cache line size of a cache coupled to the data processor, wherein the memory controller is operable to receive and schedule the dense request.

12. The data processing system of claim 11, wherein:

a first sparse request has a size corresponding to a small atom, wherein the small atom is the smallest unit of a memory system coupled to the memory controller addressable in a single bus transaction and is smaller than a large atom.

13. The data processing system of claim 11, wherein:

the dense request corresponds to a large atom, wherein the large atom is the largest unit of a memory system coupled to the memory controller addressable in a single bus transaction.

14. The data processing system of claim 11, wherein:

the data processor comprises a general purpose graphics processing unit.

15. The data processing system of claim 11, wherein:

the data processor has a single instruction, multiple data (SIMD) architecture.

16. A method for use in a data processing system, comprising:

generating memory access requests by a data processor;

receiving the memory access requests from the data processor and generating at least one memory access cycle to a memory system in response to the receiving;

receiving and storing the memory access requests in a command queue, the memory access requests including a first memory access request comprising a first read request to a first address for a small element, wherein the small element has a first size less than a large atom, and a second memory access request comprising a second read request to a second address related to the first address; and issuing a memory access to the memory system in response to the first and second memory access requests with a density greater than a density indicated by the first memory access request.

17. The method of claim 16, wherein:

the first memory access request has a pattern attribute that indicates a plurality of individual memory accesses associated therewith; and the method further comprises generating the plurality of individual memory accesses to the memory system in response to the pattern attribute.

18. The method of claim 16, wherein:

the memory access requests include a write memory access request to a third address having a third size the method further includes receiving the first memory access request subsequent to receiving the write memory access request, wherein the first size is smaller than the third size and the first address is within a region indicated by the third address and the third size.

19. The method of claim 18, wherein:

the method further includes completing the first memory access request with data from the write memory access request.

20. The method of claim 16, wherein:

the second read request is for a small element having a size less than the large atom; and the method further includes upgrading a size of the second read request to the large atom.

* * * * *